United States Patent [19]

Hara

[11] 3,923,904
[45] Dec. 2, 1975

[54] METHOD FOR PREPARING DIETHYLKETONE WITH GOOD SELECTIVITY

[75] Inventor: Hajime Hara, Fujisawa, Japan

[73] Assignee: Nippon Oil Company Ltd., Tokyo, Japan

[22] Filed: Apr. 23, 1973

[21] Appl. No.: 353,529

[30] Foreign Application Priority Data
Apr. 26, 1972   Japan.............................. 47-41862

[52] U.S. Cl. ........................ 260/597 A; 260/597 R
[51] Int. Cl.² ....................................... C07C 45/02
[58] Field of Search ..................... 260/597 A, 597 R

[56] References Cited
UNITED STATES PATENTS

| | | | |
|---|---|---|---|
| 2,839,580 | 1/1956 | Hughes et al. | 260/597 R |
| 3,040,090 | 6/1962 | Alderson et al. | 260/597 R |
| 3,168,553 | 2/1965 | Slaugh | 260/597 R |
| 3,257,459 | 1/1966 | Swakon et al. | 260/597 R |

Primary Examiner—James O. Thomas, Jr.
Assistant Examiner—James H. Reamer
Attorney, Agent, or Firm—Ostrolenk, Faber, Gerb & Soffen

[57] ABSTRACT

This invention relates to a method to produce diethylketone, with superior selectivity, from ethylene and carbon monoxide under pressure in an alcohol-water system solvent with a rhodium compound catalyst or a catalyst system comprising a rhodium compound and organophosphorus compounds having the infrared $A_1$ carbonyl stretching frequency of $Ni(CO)_3L$ (L is an organophosphorus compound) in methylene chloride in accordance with the definition by Tolman in the range above 2066 cm$^{-1}$.

9 Claims, No Drawings

METHOD FOR PREPARING DIETHYLKETONE WITH GOOD SELECTIVITY

This invention relates to a method for synthesizing diethylketone by reacting ethylene with carbon monoxide.

It is known well that in the oxo reaction, diethylketone is produced as a by-product when ethylene is employed as the olefin. Many attempts have heretofore been made to selectively synthesize diethylketone, and in most of these attempts, cobalt or rhodium compounds have been used as a catalyst as in the oxo reaction. For example, see Italian Pat. No. 475,040 and JACS, 74,4496 (1952). In these references, ethylene is reacted with carbon monoxide in the presence of an alcoholic solvent with a cobalt catalyst to obtain diethylketone, but a great amount of the catalyst and a high pressure over 200 Kg/cm$^2$ are required, and the formation of a large amount of propionaldehyde and esters of propionic acid, etc., reduces the selectivity to diethylketone.

U.S. Pat. No. 2,839,580 discloses the fact that the reaction between ethylene and carbon monoxide is carried out effectively in the presence of alcohol as a solvent to obtain diethylketone with remarkably little catalyst used. However, a total pressure as high as 250 Kg/cm$^2$ is required. Although a comparatively small amount of propionaldehyde is formed, non-volatile matters as bottoms of 25% by weight to diethylketone on fractional distillation of the reaction product remains. This shows that a large amount of compounds with high boiling points are formed in the reaction.

In the U.S. Pat. No. 3,040,090, the reaction between ethylene and carbon monoxide is performed in the presence of water or alcohol as a solvent by using a catalyst which is a chelate of noble metals of group VIII such as rhodium and ruthenium. In this work, there is necessitated a reaction pressure as high as 1,000 Kg/cm$^2$, and the large amount of high boiling compounds such as 3,6-octadiene and others formed makes the selective production of diethylketone difficult.

The U.S. Pat. No. 3,257,459 describes that diethylketone is selectively produced when the ethylene-carbon monoxide reaction is conducted in an aqueous solvent with a cobalt catalyst, provided there is also present an organic base such as tetramethylquanidiene. A maximum pressure above 350 Kg/cm$^2$ and a large quantity of catalyst are required.

There are some cases in which ethylene is reacted with carbon monoxide under a reaction condition of a lower partial pressure of hydrogen. See the U.S. Pat. No. 2,473,995 and the Germman Pat. No. 1,793,320. Both of the patents require a high pressure more than 250 Kg/cm$^2$, and the selectivity to diethylketone is also low. In the U.S. Pat. No. 2,699,453 and British Pat. No. 663,089, diethylketone is obtained by the reaction between ethylene, carbon monoxide and hydrogen in the gas phase at a pressure up to about 100 Kg/cm$^2$ in the presence of a cobalt catalyst supported on a carrier, but the content of diethylketone in the liquid reaction mixture obtained is 85% by weight maximum, and the productivity is very low as is clear from the space velocity of about 100; space velocity is herein defined as volume of gaseous reactants per volume of catalyst per hour.

As is described above, the prior art processes do not give satisfactory results in the industrial production of diethylketone, because in order to attain a pertinent conversion rate of ethylene, they require a large amount of catalyst, a small space velocity and/or a high pressure as high as more than 200 Kg/cm$^2$. In addition, propionaldehyde, esters of propionic acid and/or high boiling substances are largely formed as a by-product.

In case of using a cobalt catalyst, troublesome operations are frequently required for the circulation of the catalyst solution and the recovery and regeneration of the catalyst owing to the instability of its carbonyl complex, and therefore a great loss of the catalyst results.

Now it has been found that diethylketone is synthesized with a large reaction rate and with a good selectivity by reacting ethylene with carbon monoxide in an alcohol-water system solvent by using a rhodium compound as a catalyst under conditions of a comparatively low pressure. It has also been found that the addition of an alkylphosphine, aryl phosphine, alkylphosphite or arylphosphite, etc. to the catalyst system above further increases the reaction rate, and that a specific phosphorous compound such as triphenylphosphine functions to depress the formation of high boiling compounds such as polyketones and others.

This invention has been completed on the basis of the finding of the above facts.

An object of this invention is to provide a novel method for producing advantageously and selectively diethylketone from ethylene and carbon monoxide on an industrial scale.

Another object of this invention is to provide a novel catalyst comprising rhodium compounds or a combined catalyst system of a rhodium compound and an organophosphorous compound suitable for the selection production of diethylketone in a high yield and with comparatively simple operations.

And further objects of this invention will be seen from what will be described more in detail hereinunder.

A first point of this invention resides in that when an alcohol-water containing solvent is used, the reaction rate of diethylketone synthesis from ethylene and carbon monoxide and the selectivity to diethylketone are greatly improved compared with the reaction in an alcohol or a water solvent alone. Further, the hydrogen necessary for the forming of diethylketone is made up from the water, so waste of expensive alcohol can be avoided.

A second point of this invention is in that the reaction rate of forming diethylketone from ethylene and carbon monoxide is remarkably increased by addition of organophosphorous compounds such as $(CH_3C_6H_4)_3P$, $(C_6H_5)_3P$, $(CH_3CH_2O)_3P$, $(CH_3C_6H_4O)_3P$ and $(C_6H_5O)_3P$ to rhodium compounds.

A third point of this invention exists in that the forming of a high boiling compound such as polyketones is remarkably depressed in the reaction of ethylene and carbon monoxide using a catalyst system comprising a rhodium compound and an organophosphorous compound such as $(CH_3C_6H_4)_3P$, $(CH_3CH_2)$ $(C_6H_5)_2P$, $(C_6H_5CH_2)$ $(C_6H_5)_2P$, $(C_6H_4F)$ $(C_6H_5)_2P$, $(C_6H_5)_3P$, and $(CH_3O)$ $(C_6H_5)_2P$ added thereto, and that diethylketone is selectively synthesized.

A fourth point of this invention lies in that when the reaction between ethylene and carbon monoxide is conducted by using said catalyst and said solvent system to make diethylketone, a marked stability of the catalyst results. Owing to the increased stability of the catalyst, the catalyst solution can be used repeatedly by simply separating the unreacted gases and diethylketone from the reaction product by distillation after completion of the reaction.

As typical rhodium compounds available for this invention, the following compounds are exemplary: rhodium oxides, rhodium halogenides, rhodium carbonyls, rhodium hydride complexes, rhodium complexes having ligands such as triphenylphosphine and triphenyl arsine and a mixture thereof, for example, $Rh_2O_3$, $RhCl_3.3H_2O$, $Rh_4(CO)_{12}$, $Rh_6(CO)_{16}$, $RhCl[(C_6H_5)_3P]_3$, $[RhCl(CO)_2]_2$, $[Rh((C_6H_5)_3As)_2.(CO)_2]_2$, $RhCl(CO)[(C_6H_5)_3P]_2$, and $RhH(CO)[(C_6H_5)_3P]_3$ etc.

Organophosphorous compounds employed in this invention are $(CH_3C_6H_5)_3P$, $(C_6H_5)_3P$, $(CH_3CH_2O)_3P$, $(CH_3C_6H_5O)_3P$, $(CH_3CH_2CH_2CH_2O)_3P$ and $(C_6H_5O)_3P$, etc. These compounds correspond to those having the infrared $A_1$ carbonyl stretching frequency of $Ni(CO)_3L$ (L is an organophosphorous compound) in methylene chloride as is defined by Tolman (JACS, 92, 2953 (1970)) in the range of above 2066 $cm^{-1}$. Among organophosphorous compounds available for inhibiting the forming of high boiling substances are those of having the $A_1$ carbonyl stretching frequency of $Ni(CO)_3L$ in methylene chloride in the range of from 2,066 to 2,072 $cm^{-1}$. For example, the following compounds are within the above range: $(CH_3C_6H_4)_3P$, $(C_6H_5)_2(CH_3CH_2)P$, $(C_6H_5)_2(C_6H_5CH_2)P$, $(C_6H_5)_3P$, $(C_6H_5)_2(C_6H_4F)P$, and $(C_6H_5)_2(CH_3O)P$.

These phosphorous compounds may be used in the form of an isolable rhodium complex containing phosphorous ligands, and also may be added to rhodium compounds without phosphorous ligands. In the latter case, these phosphorous compounds are preferably added in the range of 1 – 10 moles per gram atom of metallic rhodium.

A rhodium compound as the catalyst may be added in amounts from 0.01 to 1% by weight calculated as metal base on ethylene.

Among alcoholic solvents used in this invention are included aliphatic monohydric or polyhydric alcohols and alcohols having polar groups other than hydroxyl group. Illustrative are, for example, methanol, ethanol, isopropanol, cyclohexanol, 2-ethylhexanol, ethanolamine and ethyleneglycol etc.

The quantity of water added can be widely varied in the range of from a stoichiometric amount necessary for the forming of diethylketone to an amount suitable for dissolving the catalyst homogeneously.

In addition to the solvents above, any inert solvents such as n-hexane, benzene, cyclohexane and tetralin, etc. may be used as a diluent.

The reaction of ethylene and carbon monoxide may be performed in a batch or continuous system with a pressurized reactor. The reaction temperature may be in the range of 100° – 300°C., preferably of 140° – 250°C.

Carbon monoxide is maintained in the range of 0.1 – 3.0 in molar ratio to ethylene, and the reaction pressure may be kept in the range of 10 – 300 $Kg/cm^2$ in total pressure, and of particular advantage in the range of 30 – 200 $Kg/cm^2$.

Some of preferable embodiments according to this invention are described more in detail hereinunder, but it should be understood that these will not limit this invention so far as these are within the scope and spirit of this invention.

EXAMPLES 1 – 2

In an autoclave of 50 cc capacity 21 mg of $Rh_4(CO)_{12}$ and a solvent were placed. Ethylene was introduced therein at an ordinary temperature to pressurize to 25 $Kg/cm^2$, followed by feeding under pressure of carbon monoxide to 75 $Kg/cm^2$. The reaction was carried out at 170°C. for 3 hr. The results were shown in Table 1.

Table 1

| No. of Example | | Solvent | Conversion of ethylene (mole %) | Selectivity to Diethylketone (wt%) |
| --- | --- | --- | --- | --- |
| Comparative Example | 1 | Water 20 ml | 18 | 82 |
| | 2 | methanol 20 ml | 8 | 46 |
| Example | 1 | methanol 20 ml, water 2 ml | 60 | 86 |
| | 2 | ethanol 20 ml, water 2 ml | 49 | 88 |

As is clear from Table 1, the alcohol-water solvent system turns out to be quite superior in both the conversion of ethylene and the selectivity to diethylketone. In other words, propionaldehyde could hardly be found. The ester of propionic acid and n-propyl alcohol as by-products, and the only by-products formed were high boiling substances. After the completion of the reaction, the catalyst used was completely dissolved in the water-alcohol solvent system, but was hardly dissolved in the alcohol or water solvent.

EXAMPLES 3 – 6

In an autoclave of 50 cc capacity was placed 100 mg of $RhH(CO)[P(C_6H_5)_3]_3$ which was prepared from $RhCl_3.3H_2O$ in accordance with the method of Wilkinson et al. [J. Chem. Soc., (A), 2660 (1968)]. After the addition of a solvent, ethylene was charged under pressure therein at an ordinary temperature to 25 $Kg/cm^2$, and subsequently carbon monoxide introduced under pressure to 50 $Kg/cm^2$. The reaction was carried out at 170°C. for 3 hr. The results were tabulated in Table 2.

Table 2

| No. of Example | | Solvent | Conversion of ethylene (mole %) | Selectivity to Diethylketone wt % |
| --- | --- | --- | --- | --- |
| Comparative Example | 3 | acetic acid 20 ml, water 2 ml | trace | — |
| | 4 | acetone 20 ml, water 2 ml | 4 | ~100 |
| | 5 | tetrahydrofuran 20 ml, water 2 ml | 7 | 91 |
| | 6 | methanol 20 ml | 2 | ~100 |
| | 7 | isopropanol 20 ml | 8 | ~100 |
| | 8 | water 20 ml | 5 | 80 |
| Example | 3 | methanol 20 ml, water 2 ml | 32 | 91 |
| | 4 | isopropanol 20 ml, water 2 ml | 23 | 93 |
| | 5 | 2-ethylhexanol 20 ml, water 2 ml | 31 | 90 |
| | 6 | ethanolamine 20 ml, water 2 ml | 21 | 93 |

From the table, it will be seen that the conversion of ethylene was very high in the alcohol-water solvent system, compared with that in any other solvents, and that diethylketone was formed with good selectivity. In comparative Example 7, acetone, which was the dehydrogenated product of isopropanol, was formed in an amount equivalent to that of the diethylketone formed, whereas in Example 4 hardly any acetone was formed. Thus it was affirmed that the hydrogen required for the forming of diethylketone was supplied from the water rather than from the alcohol in the water-alcohol system.

EXAMPLE 7

To an autoclave of 100 cc capacity were added 100 mg of $Rh_2O_3$, 40 ml of ethanol and 10 ml of water. Ethylene was supplied forcibly in the autoclave at an ordinary temperature, and the pressure was increased to 40 $Kg/cm^2$. Then, carbon monoxide was introduced under pressure therein to 75 $Kg/cm^2$, and the reaction was conducted at 200°C. for 2 hr. 70 mole % of ethylene was reacted, and diethylketone was obtained with a selectivity of 85 wt %.

EXAMPLE 8

To an autoclave of 100 cc were added 100 mg of $RhCl(CO)[As(C_6H_5)_3]_2$, 40 ml of methanol and 4 ml of water, and ethylene was supplied therein at an ordinary temperature, and was pressurized to 40 $Kg/cm^2$, followed by introducing carbon monoxide under pressure to 75 $Kg/cm^2$. The reaction was carried out at 140°C. for 3 hr. 62 mole % of ethylene took part in the reaction, and diethylketone was obtained with selectivity of 91 wt %.

EXAMPLE 9 – 16

A rhodium compound amounting to 0.11 milligram atom calculated as a metallic rhodium was put in an autoclave of 50 cc capacity, and 20 ml of methanol and 2 ml of water were added therein. Ethylene was filled under pressure at an ordinary temperature to 25 $Kg/cm^2$, and subsequently carbon monoxide was introduced under pressure to 50 $Kg/cm^2$. The reaction was performed at 170°C. for 1.5 hr. The results were summarized in Table 3. The rhodium complexes having organophosphorous ligands such as $Rh(CO)[(C_6H_5)_3P]_3$ were prepared in accordance with the method of Wilkinson et al., as described in Examples 3 – 6. The reaction time was made shorter and the reaction was carried under the mild conditions in order to make a comparison of the reaction rate.

complex having the same organophosphorous ligand. The organophosphorous compound may exist in the reaction system as a isolable rhodium complex containing organophosphorous ligands.

The results from Examples 11 – 14 clearly show that the forming of high boiling materials is greatly depressed by the addition of an organophosphorous compound having the $A_1$ carbonyl stretching frequency of $Ni(CO)_3L$ (L is a phosphorous ligand) in methylene chloride in the range of from 2,066 –2072 $cm^{-1}$.

In these Examples, almost all of the product formed consist of diethylketone, excepting high boiling substances and a very small amount of propionaldehyde.

EXAMPLE 17

In an autoclave of 100 cc capacity was placed 0.05 gr of $Rh(CO)[P(C_6H_5)_3]_3$, and 40 ml of methanol and 4 ml of water were added therein. Ethylene was fed under pressure into the autoclave at an ordinary temperature to 37 $Kg/cm^2$, and carbon monoxide was then forcibly introduced to 60 $Kg/cm^2$. The reactants were heated to 200°C. with stirring. The reaction was continued for 5 hr. maintaining the pressure at 80 $Kg/cm^2$ by making up carbon monoxide about every 1 hour. 40 mole % of ethylene was reacted in this manner. This corresponds to conversion of 1,500 moles of ethylene per one gram atom of rhodium. Diethylketone amounted to 97% by weight of the reaction products. As by-products, 3% of high boiling materials and trace of propionaldehyde were formed.

EXAMPLE 18

30 mg of $Rh_6(CO)_{16}$ and 135 mg of triphenylphosphine were placed in an autoclave of 300 cc capacity, and 150 ml of 2-ethylhexanol and 10 ml of water were added therein. Ethylene was filled under pressure therein at an ordinary temperature to 50 $Kg/cm^2$ and subsequently carbon monoxide was introduced in the same way to reach 65 $Kg/cm^2$. The reaction was carried out at 200°C. with stirring. Carbon monoxide was made up at an interval of 30 min. so as to maintain the pressure at 120 $Kg/cm^2$. The reaction was continued for 4 hr. Ethylene amounting to 49% took part in the reaction. This corresponds to the consumption of 2800 moles of ethylene per one gram atom of rhodium. Diethylketone was thus obtained with selectivity of 93 wt %.

Table 3

| No. of Example | Catalyst | Phosphorous Compound | | | Conversion of Ethylene (mole %) | High Boiling Substances (wt %) |
|---|---|---|---|---|---|---|
| | | Compound | P/Rh (molar ratio) | $vC=O^*$ $(cm^{-1})$ | | |
| 9 | $Rh_4(CO)_{12}$ | nil | — | — | 16 | 14 |
| 10 | $RhH(CO)[(CH_3CH_2CH_2CH_2)_3P]_3$ | nil | — | 2060.3 | 10 | 24 |
| 11 | $Rh_4(CO)_{12}$ | $(CH_3C_6H_4)_3P$ | 2 | 2066.7 | 26 | 4 |
| 12 | $RhH(CO)[(C_6H_5)_3P]_3$ | nil | — | 2068.9 | 28 | 3 |
| 13 | $Rh_4(CO)_{12}$ | $(C_6H_5)_3P$ | 3 | 2068.9 | 35 | 3 |
| 14 | $Rh_4(CO)_{12}$ | $(C_6H_5)_2(CH_3CH_2O)P$ | 3 | 2071.6 | 33 | 3 |
| 15 | $Rh_4(CO)_{12}$ | $(CH_3CH_2CH_2CH_2O)_3P$ | 3 | 2075.6 | 37 | 10 |
| 16 | $RhH(CO)[(C_6H_5O)_3P]_3$ | nil | — | 2085.3 | 39 | 12 |

*$A_1$ carbonyl stretching frequencies of $Ni(CO)_3L$ in methylene chloride (L is a phosphorous ligand).

As is seen from the comparison of Examples 9 and 10 with examples 11 – 16, the reaction rate is increased by the addition of an organophosphorous compound having the $A_1$ carbonyl stretching frequency of $Ni(CO)_3L$ (L is a phosphorous ligand) in methylene chloride in the range of above 2066 $cm^{-1}$ or by using a rhodium

EXAMPLE 19

To 100 mg of $Rh_4(CO)_{12}$ and 410 mg of triphenylphosphine in an autoclave of 300 cc capacity were added 120 ml of 2-ethylhexanol and 12 ml of water. Ethylene was charged under pressure therein at an ordinary temperature to reach 50 $Kg/cm^2$, followed by introducing under pressure carbon monoxide until the pressure reached 75 Kg/cm². The contents of the autoclave was heated to 200°C. with stirring. When the pressure of the reaction system was reduced below 120 Kg/cm², carbon monoxide was supplied every 30 min. in order to maintain the pressure at 120 Kg/cm², and the reaction was continued for 3 hr. After the completion of the reaction, the autoclave was cooled to room temperature to draw out the unreacted gases. Then the autoclave was heated to 110°C. to distill off diethylketone. To the autoclave were added water, ethylene and carbon monoxide in the same way as described above, and the reaction was conducted under the same conditions as the above. Although this operation was repeated five times, the catalyst maintained good activity in the last reaction. All of the reaction products were combined and fractionated to obtain 146 gr. of diethylketone.

What is claimed is:

1. A method for producing diethylketone with increased formation velocity for reacting ethylene with carbon monoxide at a temperature of 100° – 300°C., a pressure of 10 – 300 Kg/cm², and in a alcohol-water solvent system, said alcohol selected from the group consisting of lower saturated aliphatic monohydric alcohols and ethyleneglycol, in the presence of a combined catalyst system of a rhodium compound selected from the group consisting of rhodium oxide, rhodium halogenide, rhodium carbonyl, rhodium complexes having ligands selected from the group consisting of triphenyl phosphine, triphenyl arsine and mixtures thereof, and an organophosphorous compound having an infrared $A_1$ carbonyl stretching frequency of $Ni(CO)_3L$ (L represents the organophosphorous compound) in methylene chloride in accordance with the definition by Tolman in the range of from 2,066 cm$^{-1}$ to 2,072 cm$^{-1}$, thereby inhibiting the formation of high boiling substances as by-products.

2. The method of claim 1 wherein said organophosphorous compound is selected from the group consisting of $(CH_3C_6H_4)_3P$, $(CH_3CH_2)$ $(C_6H_5)_2P$, $(C_6H_5CH_2)$ $(C_6H_5)_2P$, $(C_6H_4F)$ $(C_6H_5)_2P$, $(C_6H_5)_3P$, and $(CH_3O)$ $(C_6H_5)_2P$.

3. The method of claim 1 wherein said organophosphorous compound is selected from the group consisting of $(CH_3C_6H_4)_3P$, $(C_6H_5)_3P$, $(CH_3CH_2O)_3P$, $(CH_3C_6H_4O)_3P$ and $(C_6H_5O)_3P$.

4. The method of claim 1 wherein said rhodium compound is selected from the group consisting of $Rh_2O_3$, $RhCl_3 \cdot 3H_2O$, $Rh_4(CO)_{12}$, $Rh_6(CO)_{16}$, $RhCl[(C_6H_5)_3P]_3$, $[RhCl(CO)_2]_2$, $[Rh((C_6H_5)_3As)_2(CO)_2]_2$, $RhCl(CO) [(C_6H_5)_3P]_2$, and $RhH(CO)[(C_6H_5)_3P]_3$.

5. The method of claim 1 wherein said alcohol is selected from the group consisting of methanol, ethanol, isopropanol, cyclohexanol, 2-ethylhexanol, ethanolamine, and ethyleneglycol.

6. The method of claim 1 wherein said rhodium compound is used in an amount of from 0.01 to 1 weight percent, calculated as rhodium metal based on ethylene.

7. The method of claim 1 wherein said rhodium compound is selected from the group consisting of $Rh_2O_3$, $RhCl_3 \cdot 3H_2O$, $Rh_4(CO)_{12}$, $Rh_6(CO)_{16}$, $RhCl[C_6H_5)_3P]_3$, $[RhCl(CO)_2]_2$, $[Rh((C_6H_5)_3As)_2 \cdot (CO)_2]_2$, $RhCl(CO) [(C_6H_5)_3P[_2$, and $RhH(CO) [(C_6H_5)_3P]_3$, the organophosphorous compound is selected from the group consisting of $(CH_3C_6H_4)_3P$, $(CH_3CH_2)$ $(C_6H_5)_2P$, $(C_6H_5CH_2)$ $(C_6H_5)_2P$, $(C_6H_4F)$ $(C_6H_5)_2P$, $(C_6H_5)_3P$, and $(CH_3O)$ $(C_6H_5)_2P$, and wherein said alcohol is selected from the group consisting of methanol, ethanol, isopropanol, cyclohexanol, 2-ethylhexanol, ethanolamine, and ethyleneglycol.

8. The method of claim 6 wherein the organophosphorous compound is employed in the range of 1 to 10 moles per gram atom of metallic rhodium, wherein the rhodium compound is used in an amount of from 0.01 to 1 weight percent calculated as metallic rhodium based on ethylene, the reaction temperature is 140°–250°C., and the reaction pressure is 30–200 kg/cm².

9. The method of claim 7 wherein the carbon monoxide to ethylene molar ratio is in the range of 0.1 to 3.0.

* * * * *